US010551923B2

(12) United States Patent
Pirasmepulkul et al.

(10) Patent No.: US 10,551,923 B2
(45) Date of Patent: Feb. 4, 2020

(54) HAPTIC GLOVE AS A WEARABLE FORCE FEEDBACK USER INTERFACE

(71) Applicant: Worcester Polytechnic Institute, Worcester, MA (US)

(72) Inventors: Saraj Pirasmepulkul, Wocester, MA (US); Alexander Caracappa, Worcester, MA (US); Peerapat Luxsuwong, Worcester, MA (US); Cagdas D. Onal, Allston, MA (US); William Michalson, Worcester, MA (US); Tri Khuu, Worcester, MA (US); Ming Luo, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 286 days.

(21) Appl. No.: 15/586,684

(22) Filed: May 4, 2017

(65) Prior Publication Data

US 2017/0322629 A1    Nov. 9, 2017

Related U.S. Application Data

(60) Provisional application No. 62/331,531, filed on May 4, 2016.

(51) Int. Cl.
| | | |
|---|---|---|
| *G06F 19/00* | (2018.01) | |
| *G06F 3/01* | (2006.01) | |
| *G06F 3/0484* | (2013.01) | |

(52) U.S. Cl.
CPC .............. *G06F 3/016* (2013.01); *G06F 3/014* (2013.01); *G06F 3/0484* (2013.01); *G10H 2220/321* (2013.01)

(58) Field of Classification Search
CPC ........ G06F 3/016; G06F 3/0346; G06F 3/017; G06F 3/011; G06F 3/014; G06F 3/0484;
(Continued)

(56) References Cited

U.S. PATENT DOCUMENTS 4,936,507 A * 6/1990 Weinstein ............. B05B 3/1064
239/223
9,468,847 B2 * 10/2016 Bekri .................... A63F 13/285
(Continued)

FOREIGN PATENT DOCUMENTS

WO    WO 2011/125007    10/2011

OTHER PUBLICATIONS

International Search Report, PCT/US2017/031024, dated Aug. 17, 2017, pp. 2.

*Primary Examiner* — Ian Jen
(74) *Attorney, Agent, or Firm* — Armis IP Law, LLC

(57) ABSTRACT

A toroidal actuator is responsive to a teleoperator for providing haptic feedback responsive to a curvature or articulated movement applied to a gripped object. The toroidal actuator surrounds an operator member such as a finger, and is responsive to pneumatic pressure for increasing telepresence force defined by resistance encounter against a teleoperated robotic claw. As the teleoperated claw grips an object, increased pneumatic pressure in the toroidal actuator tends to elongate the toroidal shape in a linear manner and oppose a curvature force applied by an inserted operator finger. Resistive force is based on soft sensing of the gripped object, thus the toroidal actuator applies an increasing resistive force to curvature as the robotic claw closes around a gripped object by solenoid regulated air pressure. A typical assembly includes at least 3 toroidal actuators for two digits and a thumb of an operator.

19 Claims, 6 Drawing Sheets

(58) Field of Classification Search
CPC ...... G06F 2203/0383; G10H 2220/311; G10H 2220/321
See application file for complete search history.

(56) References Cited

U.S. PATENT DOCUMENTS

| | | | |
|---|---|---|---|
| 2010/0054903 A1* | 3/2010 | Jones | B25J 15/0023 414/800 |
| 2011/0148607 A1* | 6/2011 | Zeleny | A41D 13/0015 340/407.1 |
| 2012/0218184 A1* | 8/2012 | Wissmar | G06F 3/0346 345/158 |
| 2013/0113704 A1* | 5/2013 | Sarrafzadeh | G06F 3/033 345/158 |
| 2013/0282179 A1* | 10/2013 | Jacob | B25J 9/1689 700/257 |
| 2014/0336669 A1* | 11/2014 | Park | A61B 34/30 606/130 |

* cited by examiner

HAPTIC GLOVE AS A WEARABLE FORCE FEEDBACK USER INTERFACE

RELATED APPLICATIONS

This application claims the benefit under 35 U.S.C. § 119(e) of U.S. Provisional Patent Application No. 62/331,531, filed May 4, 2016, entitled "HERO GLOVE" incorporated herein by reference in entirety.

BACKGROUND

Increased development in robotics technology has allowed for more capable robotic systems to perform more dexterous tasks in remote conditions that may be too dangerous for humans. Such tasks often include object grasping and manipulation, as can be seen in industrial assembly lines, space exploration, search and rescue systems, and military applications where robot manipulators can be used for hazardous material handling. To allow for the control of remote systems to perform unstructured and non-repetitive tasks, robot teleoperation is still more suitable over fully autonomous robots as it allows for the human user to be in direct control over the system. Teleoperation allows human operators to properly interact with the slave robot and manipulate objects located in remote environments. Similar to teleoperation, telepresence allows for sensory information from the environment to be communicated back to the user to impart a feeling of physical presence at the remote site. Haptic feedback is an example of such telepresence, which recreates the sense of touch by applying mechanical forces, vibration, or motions to the user based on sensory readings from the remote robotic system.

SUMMARY

A toroidal actuator is responsive to a teleoperator for providing haptic feedback responsive to a curvature or articulated movement applied to a gripped object. The toroidal actuator surrounds an operator member such as a finger, and is responsive to pneumatic pressure for increasing telepresence force defined by resistance encountered against a teleoperated robotic claw or member. As the teleoperated claw grips an object, increased pneumatic pressure in the toroidal actuator tends to elongate the toroidal shape in a linear manner and oppose a curvature force applied by an inserted operator finger. Resistive force is based on soft sensing of the gripped object, thus the toroidal actuator applies an increasing resistive force to curvature as the robotic claw closes around a gripped object by solenoid regulated air pressure. Fingertip actuators at one end of the toroidal actuator engage an operator fingertip for haptic feedback of a touch sensation. A completed assembly includes at least 3 toroidal actuators for two digits and a thumb of an operator, fingertip actuators, and three positioning sensors on an operator's arm for disposing robotic members positioning the claw.

Configurations herein are based, in part, on the observation that haptic feedback has become popular for increasing realism and effectiveness of robotic systems by providing perceptible feedback for technical and/or delicate operations such as hazardous, medical or concealed locations. Unfortunately, conventional approaches for haptic feedback are one dimensional or linear, providing information about contact, but unable to reflect gradual increases of feedback force as in a curved or articulated member contacting an object, particularly a resilient object that offers deflection in response to external manipulation. Accordingly, configurations herein substantially overcome the shortcomings of electric, vibratory, or linear haptic feedback by providing a toroidal actuator that surrounds an operator member such as a finger, and is responsive to pneumatic pressure for increasing internal pressure in the toroidal shape for tending to dispose the toroid, and a concentric void securing the finger, in a linear position to provide resistance to additional curvature or articulated movement of the finger.

A particular feature of the toroidal actuator is to provide haptic feedback to the user using the force exerted on the robot's end-effector as sensory data. To provide accurate, realistic feedback, soft robotics technology is employed to create toroidal shaped pneumatic actuators that inflate and thereby provide resistance on the user's finger joints. In creating this resistance in the user's joints using the air filled toroid, the toroidal actuator simulates the sensation of grabbing a nondeformable object in the user's hand. In order to replicate the sense of touch on the robot's finger tips and palm, air-filled silicone domes inflate up when the robot touches an object.

In a particular example as disclosed herein, a telepresence operator device includes a teleoperator for detecting movement of a slave manipulator responsive to an operator, and an interface to the slave manipulator for transmitting the detected movement and receiving telepresence signals from the slave manipulator. One or more toroidal actuators attached to the teleoperator engages a user's fingers and is responsive to the telepresence signals for providing haptic feedback based on the slave manipulator, such that the haptic feedback is indicative of a compressive resistance force from a robotically gripped object.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations below depict an example implementation of the toroidal actuator in a telepresence environment used for gripping an object. Alternate configurations may employ other uses of the toroidal, fluidic activation for providing haptic feedback. Haptic feedback is particularly beneficial for precision robotics designed for teleoperation.

Teleoperation is the process of operating a vehicle or system over a distance using human intelligence, where the human user (operator) is the person who monitors the operated machine and makes the needed control actions. This distance can vary from micromanipulation, operating with a scale of several centimeters, to space applications where the range spans millions of kilometers. The main function of a teleoperation system is to assist the operator in performing and accomplishing complex and uncertain tasks in hazardous and less structured environments, such as space, nuclear plants, battlefield, surveillance, and underwater operations. A typical teleoperation system usually composes of two robot teleoperators that are connected mechanically, electrically or wirelessly in a manner that allows the human operator to control one of the teleoperators, called the master, to generate commands that map to the remote slave manipulator, called the slave.

The teleoperator is thus a machine that enables the human user or operator to sense, grasp, and mechanically manipulate objects from a distance. In general, any tool that extends a person's mechanical action beyond her reach is considered to be a teleoperator. A telerobot is a subclass of a teleoperator, which may be defined as a robot that accepts instructions from a distance, generally from a human operator and performs live actions at a distant environment through the use of sensors or other control mechanisms. A telerobot usually has sensors and effectors for manipulation and mobility, such that the human operator may communicate with both. Telemanipulation refers to when a slave robot arm or system, usually in a remote and/or dangerous environment, tracks the motion of the master manipulator or follows commands accordingly. Telemanipulation is divided into two strongly coupled processes; the interaction between the operator and the master device, and the interaction between the remote slave device and its environment.

Figure 1:
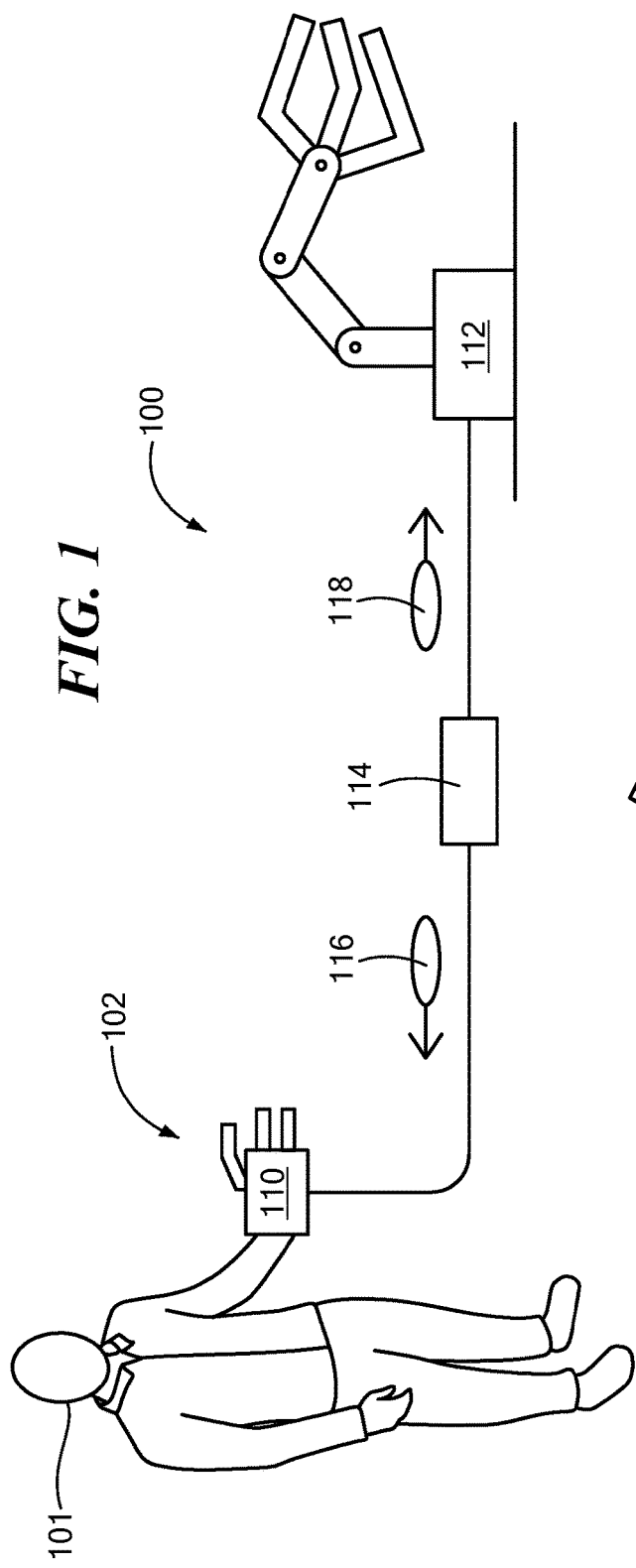
FIG. 1 is a context diagram of a robotics environment suitable for use with the present invention.

In the example below, FIG. 1 is a context diagram of a robotics environment 100 suitable for use with the present invention. Referring to FIG. 1, a telepresence operator device 102 includes a teleoperator 110 for detecting movement of a slave manipulator 112 responsive to the operator 102. An interface 114 to the slave manipulator 112 is operable for transmitting the detected movement and receiving telepresence signals 116 from the teleoperator 110. The operator device 102 transmits teleoperative signals 118 to the teleoperator 110, and includes one or more toroidal actuators 150-1 . . . 150-3 (150 generally) responsive to the telepresence signals 116 for providing haptic feedback based on the slave manipulator 112. The haptic feedback is indicative of a compressive resistance force from a robotically gripped object. Any suitable wired or wireless mechanism may be employed for the telepresence and teleoperator signals 116, 118. A human agent 101 is typically in communication with the operator device 102 for detecting movement and providing the haptic feedback.

Figure 2:
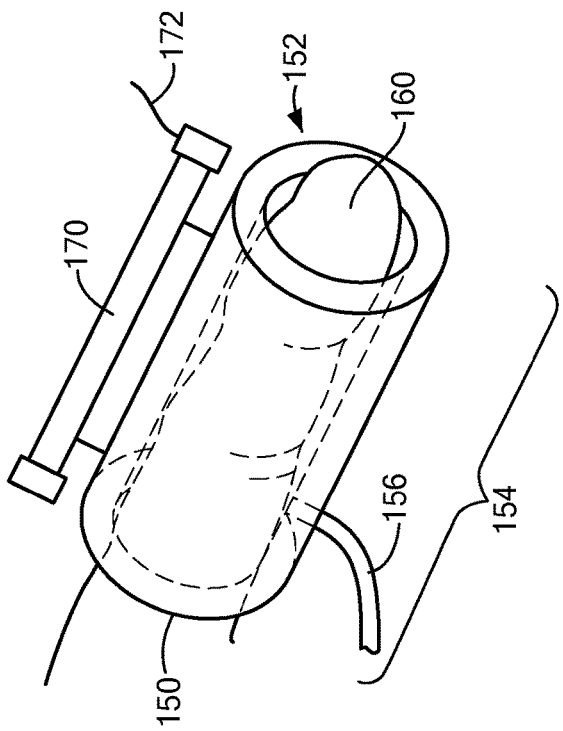
FIG. 2 is a perspective view of the toroidal actuator in the environment of FIG. 1.

FIG. 2 is a perspective view of the toroidal actuator 150 in the environment of FIG. 1. Referring to FIGS. 1 and 2, the toroidal actuator 150 is responsive to fluidic pressure for providing haptic feedback from a teleoperated robotic member, the haptic feedback defined by increasing fluidic pressure indicative of a compressive resistance force from a robotically gripped object. In the example shown, the toroidal actuator 150 takes the form of an elongated cylindrical shape having a tubular void defining an elongated cavity 152 or void adapted for insertion of a digit (finger) of a user. The toroidal actuator 150 is a fluidically sealed, tubular shape that tends towards a rigid, linear orientation from increased internal pressure. A deformable orientation, such as from an articulated user digit, is permitted at a lower pressure, and the toroidal actuator resists curvature as pressure is increased. A supply tube 156 is configured to provide air pressure or other fluidic medium for increasing pressure in the toroidal actuator 150.

The toroidal actuator 150 includes an elongated body adapted to contain the pressurized fluid (air), and the elongated cavity 152 is concentrically disposed within the elongated body 154. The elongated cavity 152 is adapted to define a linear cavity or shape responsive to increased fluidic pressure, such that a force required to manipulate the elongated cavity in an annular shape is proportional to the fluid pressure. In other words, as the air pressure in the toroidal actuator 150 increases, the elongated shape tends towards a linear orientation. Other fluidic approaches, such as hydraulic response, may be employed. An inserted user member 160, or digit, therefore, will encounter increased resistance to an articulation or "bend" as the pressure increases to simulate resistance from a gripped object. A curvature sensor such as an optical tube 170 provides teleoperative signals 118 to the robotic teleoperator 110 via an optical signal 172. In the example configuration, the curvature sensor is an optical sensor disposed at an end of a light diffusing tube.

Figure 3A:
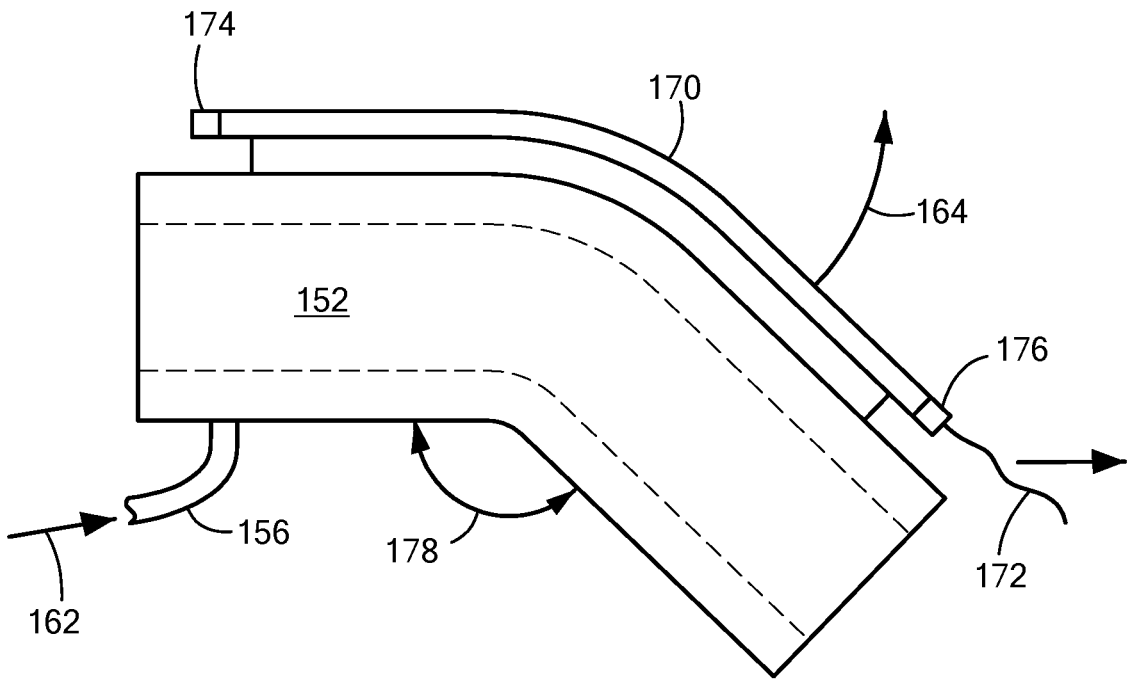
FIGS. 3A and 3B show the toroidal actuator in an extended and retracted state.
Figure 3B:
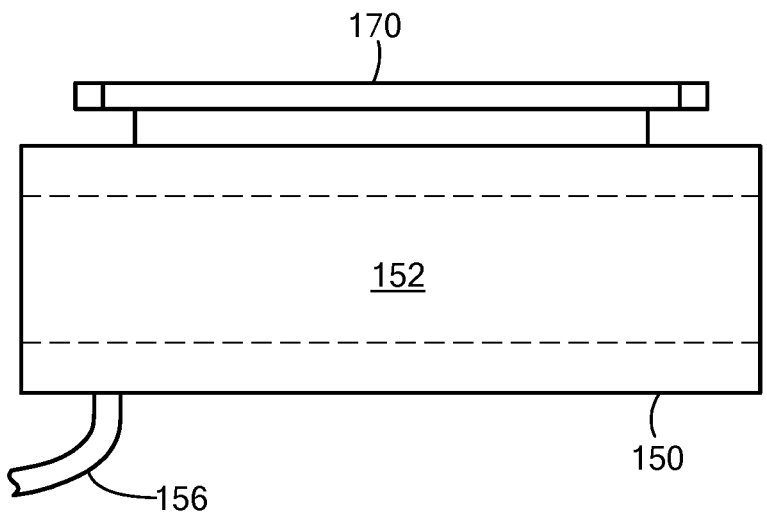

FIGS. 3A and 3B show the toroidal actuator 150 in an extended (FIG. 3A) and retracted state (FIG. 3B). Referring to FIGS. 2-3B, the toroidal actuator 150 is responsive to the fluid pressure 162 for exerting a straightening force, shown by arrow 164, on a user member 160 (finger or digit) inserted within a void or cavity 152 in the toroidal actuator 150. As discussed above, the toroidal actuator 150 defines an elongated cavity 152, such that the cavity 152' may maintain a curved shape at a lower fluid pressure and assume a linear shape 152" in response to increasing fluid pressure as air pressure 162 inflates the toroidal actuator 150. The toroidal actuator 150 is therefore configured to exert a force on an object in the cavity to conform to the linear shape. In the disclosed approach, the object is a user's finger and the response is based on resistance from a robotically gripped object.

The telepresence signals 116 initiate haptic feedback for inflating the toroidal actuator 150 from increased pressure. This is in response to teleoperator signals emanating from the optical tube 170 adjacent the toroidal actuator 150. The optical tube 170 is flanked by an emitter 174 and optical sensor 176. The intensity of received light transmitted from the emitter 174 to the optical sensor 176 diminishes proportionally with the curvature, as light transmission erodes around the curve. The optical signal 172 driving the robotic gripping motion is based on the intensity of light received by the optical sensor 176 and diminishes with an increased articulation angle 178.

In this manner, the toroidal actuator 150 is configurated for curvature sensing of an inserted member 160, such that the interface 114 is adapted to transmit the curvature as the detected movement, in which the pressure in the toroidal actuator 150 increases based on sensed resistance force from a robotically gripped object, now discussed further below.

Figure 4:
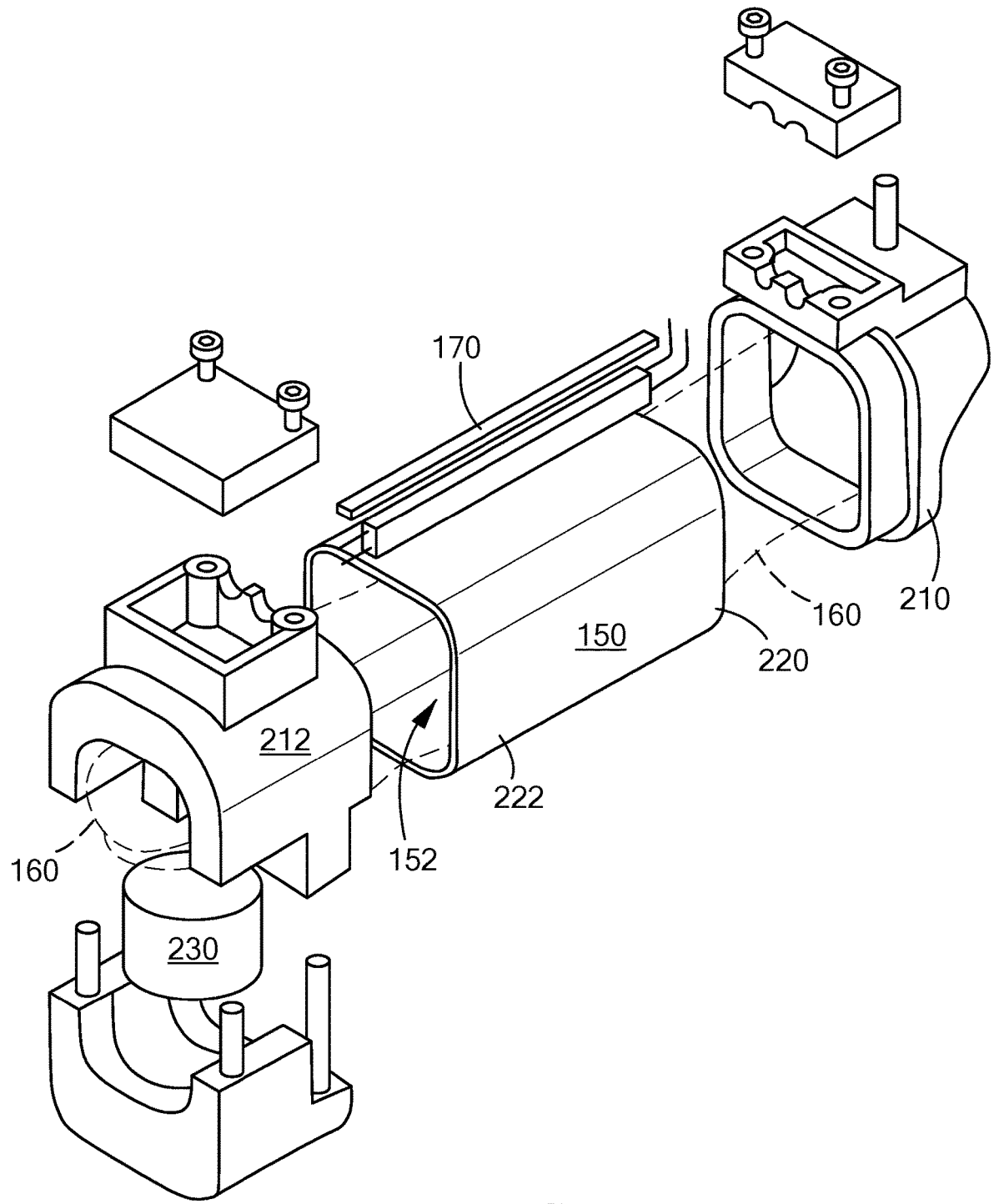
FIG. 4 shows as exploded view of a toroidal actuator of FIGS. 2-3B.

FIG. 4 shows an exploded view of a toroidal actuator of FIGS. 2-3B. Referring to FIGS. 2 and 4, the toroidal actuator 150 is disposed between a proximal frame 210 and a distal frame 212. The generally tubular shape of the toroidal actuator 150 may take a more rectangular form in response to a shape of the frames 210, 212, however the elongated cavity 152 operates similarly with respect to the member 160 inserted into a proximal end 220. The inserted member extends to a distal end 222 where the member 160 communicates with an end actuator 230. The end actuator 230 provides haptic feedback to a fingertip portion 160' of the member 160.

Figure 5:
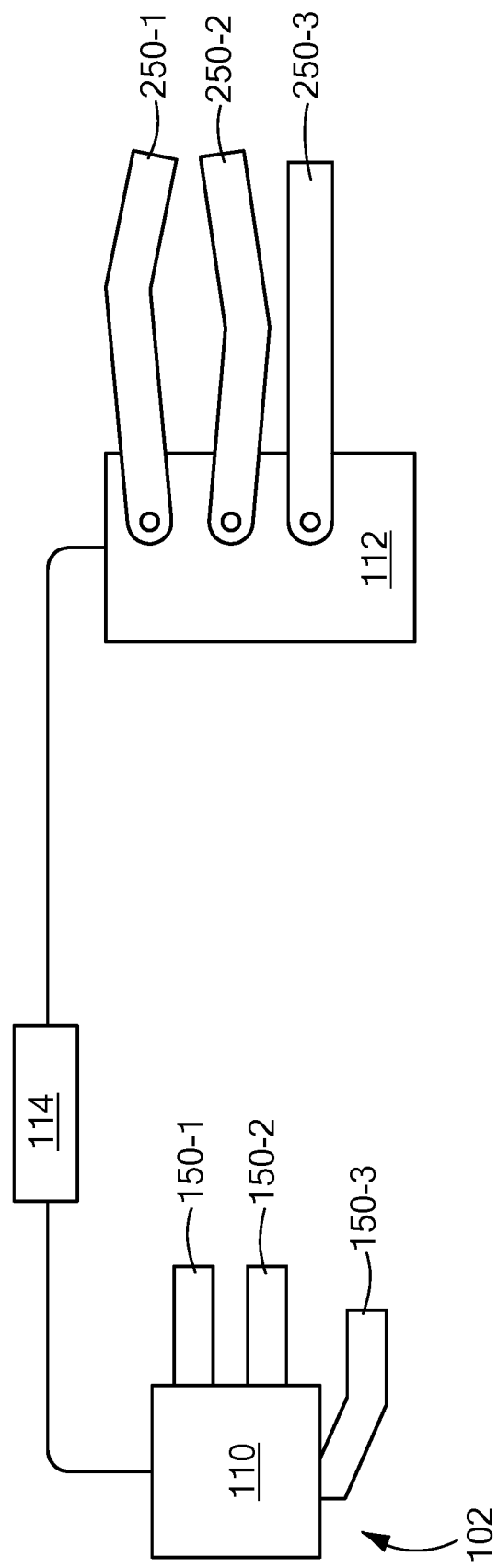
FIG. 5 shows a plurality of toroidal actuators in an operator glove assembly.

FIG. 5 shows a plurality of toroidal actuators in an operator glove assembly. In a particular configuration, the toroidal actuators 150 are arranged in an assembly including two digits 150-1, 150-2 and a thumb 150-3, form an integrated assembly with the operator device 102 to correspond to slave members 250-1 . . . 250-3 driven from the slave manipulator. The integrated assembly forms a Haptic Exoskeletal Robot Operator (HERO) glove assembly suited for a human user hand.

Figure 6:
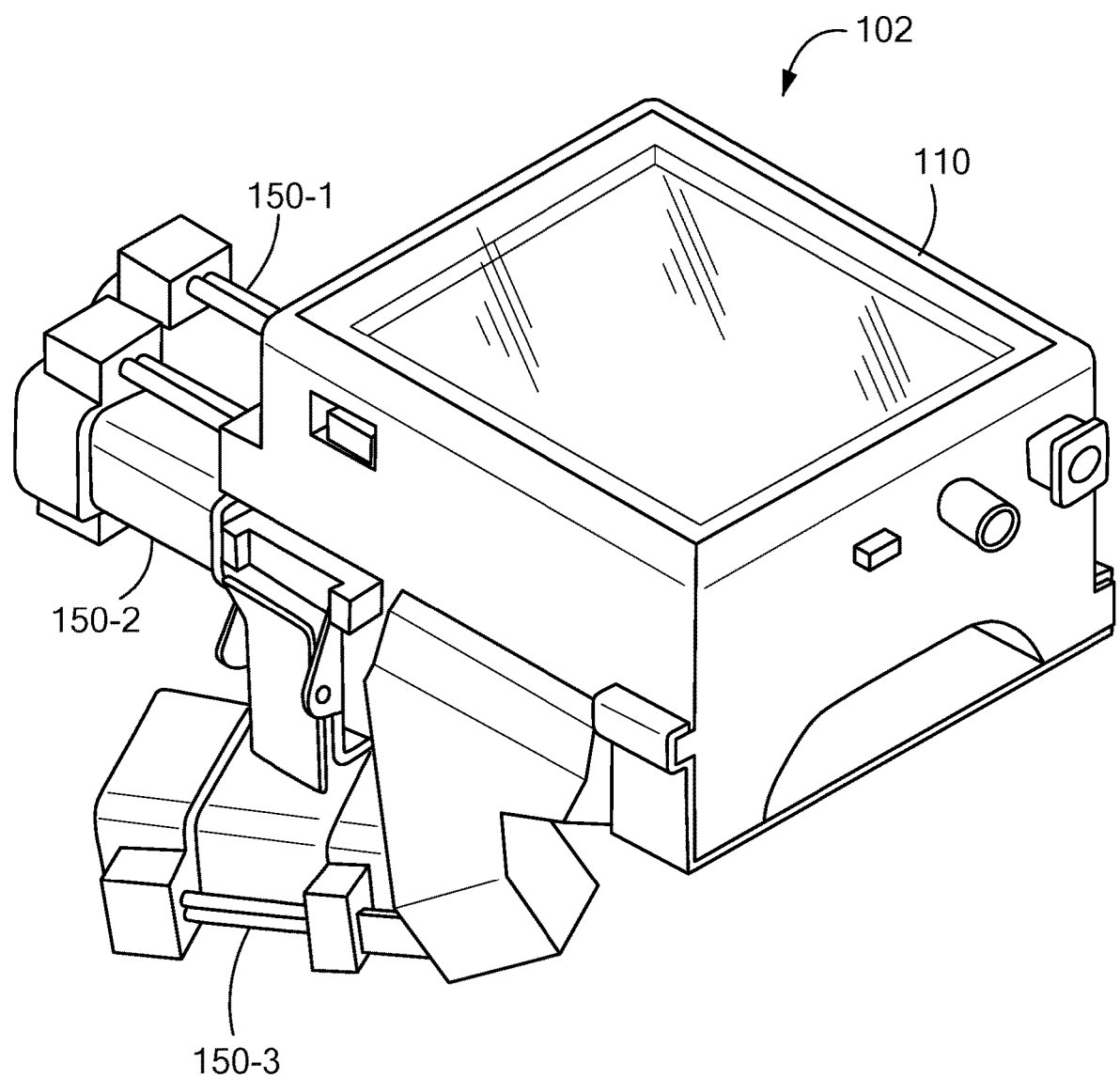
FIG. 6 shows a perspective view of the glove assembly of FIG. 5

FIG. 6 shows a perspective view of the glove assembly of FIG. 5. Referring to FIGS. 5 and 6, the operator device 102 is above a wrist position of a user for enabling insertion of fingers into the toroidal actuators 150-1 and 150-2 and a thumb into toroidal actuator 150-3. The dimensions of the toroidal actuators 150 in the example of FIG. 6 is such that the fingers 150-1, 150-2 have a length roughly 3 times the width and the thumb actuator 150-3 is about twice as long as it is wide. Other suitable dimensions may be employed.

Figure 7:
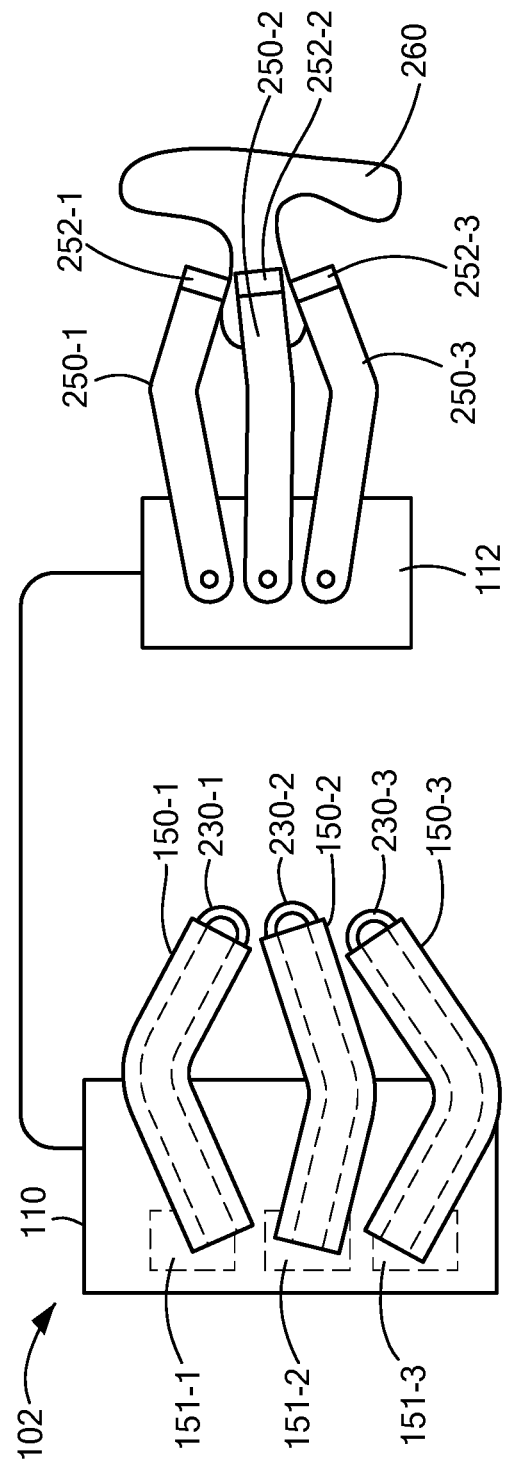
FIG. 7 shows the glove of FIG. 5 being used to grip an object.

FIG. 7 shows the glove of FIG. 5 being used to grip an object. Referring to FIGS. 4, 5 and 7, the slave members 250 have closed around a robotically gripped object 260. Touch sensors 252-1 . . . 252-3 disposed at the ends of respective slave members 250 sense contact and pressure with the grasped object 260.

Each of the toroidal actuators 150 is responsive based on soft sensing of the robotic actuator operating as the slave member 250 responsive to curvature of the toroidal actuator 150. The fluidic pressure in the toroidal actuator 150 increases in response to an increased force signal from the robotic actuator. Soft touch sensors 252, which return a variable or proportional signal indicative of a grasp pressure, are used to define a pressure for the toroidal actuators 150.

Each of the toroidal actuators 150 is responsive to a solenoid valve driven by a PWM (pulse width modulation) for exerting the fluidic pressure. Pressure to the toroidal actuators is controlled by solenoid valves 151-1 . . . 151-3 and managed via pulse width modulation (PWM) or other suitable control to attain the desired pressure and resistance. The solenoid valves 151 are configured to vary the pressure in the toroidal actuators 150 to simulate the sense of touch. Curvature sensors 170 and inertial measurement units are used to capture the glove's pose to control the slave robot, or teleoperator 110.

Contact sense denoting an initial contact may be separated from the variable force response provided by the toroidal actuators. Each of the toroidal actuators 150 may have an end actuator 230-1 . . . 230-3 disposed at a distal end 212 of the toroidal actuator 150. As indicated above, each toroidal actuator 150 further includes a proximal end 210 adapted for insertion of an operator member 160, such that the end actuator 230 is adapted for communication with the operator member 160 and responsive to robotic contact with the robotically gripped object 260. The end actuator 230 may provide a vibratory stimulus, a mild electrical signal, or other stimuli to a fingertip end of the inserted member 160. It should be emphasized that the "touch" sensation provided by the end actuators 230 may be distinct from the proportional response of the toroidal actuator 150 response to the soft touch sensors 252, as the touch sensation is a Boolean relation, while the toroidal actuator 150 provides an increasing force as the slave member 150 grip is increased.

Figure 8:
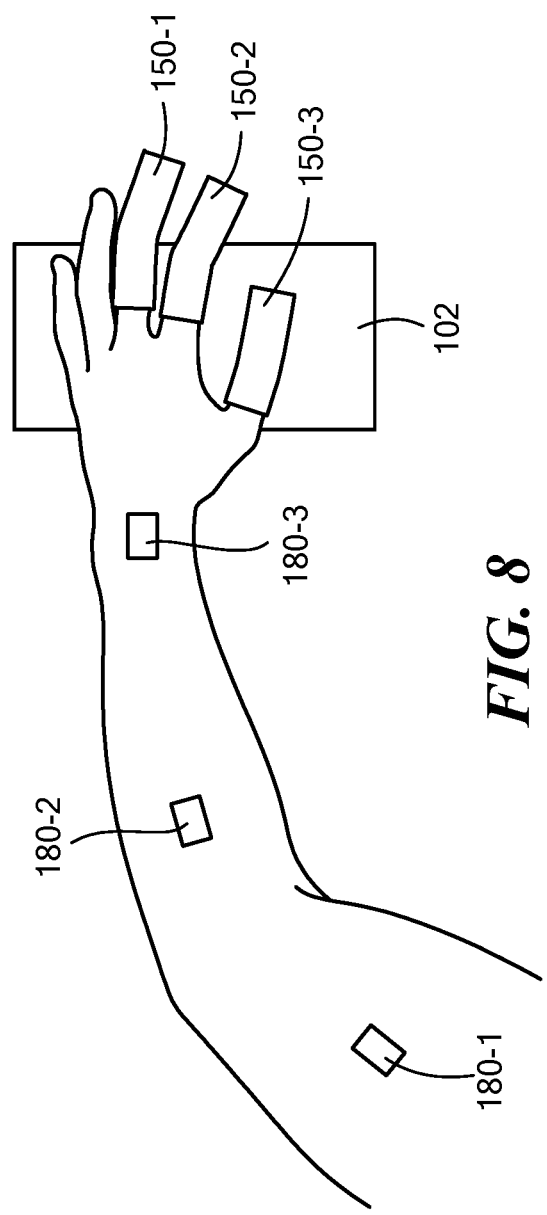
FIG. 8 shows a full operator telepresence arm assembly using the glove assembly of FIGS. 6 and 7.

FIG. 8 shows a full operator telepresence arm assembly using the glove assembly of FIGS. 6 and 7. The glove assembly defining the operator device 102 as in FIG. 6 may be combined with a robotic positioning apparatus for disposing the teleoperator "claw" including the slave members 250. The toroidal actuator 150 is coupled to a robotic master, such that the teleoperated robotic member is responsive to the robotic master for positioning the teleoperated robotic member in communication with the robotically gripped object. 260. Positioning sensors 180-1 . . . 180-3 sense movement of a user's upper arm, lower arm and wrist for translating movement, and dispose the slave members 250 of the teleoperator 110 to correspond to the detected arm movements.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A telepresence operator device, comprising:
    a teleoperator for detecting movement of a slave manipulator responsive to an operator;
    an interface to the slave manipulator for transmitting the detected movement and receiving telepresence signals from the slave manipulator; and
    a toroidal actuator on the teleoperator and responsive to the telepresence signals for providing haptic feedback based on the telepresence signals, the toroidal actuator responsive to fluidic pressure for providing the haptic feedback from a teleoperated robotic member, the haptic feedback defined by increasing fluidic pressure indicative of a compressive resistance force from a robotically gripped object.

2. The device of claim 1 wherein the toroidal actuator is responsive to the fluid pressure for exerting a straightening force on an operator member inserted within a void in the toroidal actuator.

3. The device of claim 2 wherein the toroidal actuator defines an elongated cavity, the cavity having a curved shape at a lower fluid pressure and assuming a linear shape in response to increasing fluid pressure, the toroidal actuator exerting a force on an object in the cavity to conform to the linear shape.

4. The device of claim 1 wherein the toroidal actuator is configured for curvature sensing of an inserted member, the interface adapted to transmit the curvature as the detected movement, the pressure increasing based on sensed resistance force from the robotically gripped object.

5. The device of claim 4 wherein the toroidal actuator includes an elongated body adapted to contain pressurized fluid, and an elongated cavity concentrically disposed within the elongated body, the elongated cavity adapted to define a linear cavity responsive to increased fluidic pressure, such that a force required to manipulate the elongated cavity in an annular shape is proportional to the fluid pressure.

6. The device of claim 1 further comprising an end actuator disposed at a distal end of the toroidal actuator, the toroidal actuator further having a proximal end adapted for insertion of an operator member, the end actuator adapted for communication with the operator member and responsive to robotic contact with the robotically gripped object.

7. The device of claim 1 wherein the toroidal actuator is responsive to a solenoid valve driven by a PWM (pulse width modulation) for exerting the fluidic pressure.

8. The device of claim 1 wherein the toroidal actuator is coupled to a robotic master, the teleoperated robotic member responsive to the robotic master for positioning the teleoperated robotic member in communication with the robotically gripped object.

9. The device of claim 2 wherein the toroidal actuator is responsive based on soft sensing of the robotic actuator, the fluidic pressure in the toroidal actuator increasing in response to an increased force signal from the robotic actuator.

10. The device of claim 4 wherein the curvature sensor is an optical sensor disposed at an end of a light diffusing tube.

11. A method of robotic teleoperation, comprising: detecting movement of a slave manipulator responsive to an operator; receiving telepresence signals from the slave manipulator indicative of contact with an object; and adjusting a rigidity in a toroidal actuator in response to the telepresence signals for providing haptic feedback based on the slave manipulator, the haptic feedback defined by fluid pressure indicative of a compressive resistance force from a robotically gripped object for providing the haptic feedback from a teleoperated robotic member, the haptic feedback defined by increasing fluidic pressure indicative of a compressive resistance force from a robotically gripped object.

12. The method of claim 11 wherein the toroidal actuator is responsive to fluidic pressure for providing haptic feedback from a teleoperated robotic member, the haptic feedback defined by increasing fluidic pressure indicative of a compressive resistance force from a robotically gripped object.

13. The method of claim 12 wherein the toroidal actuator is responsive to the fluid pressure for exerting a straightening force on an operator member inserted within a void in the toroidal actuator.

14. The method of claim 12 wherein the toroidal actuator defines an elongated cavity, the cavity having a curved shape at a lower fluid pressure and assuming a linear shape in response to increasing fluid pressure, the toroidal actuator exerting a force on an object in the cavity to conform to the linear shape.

15. The method of claim 11 wherein the toroidal actuator is configured for curvature sensing of an inserted member, the interface adapted to transmit the curvature as the detected movement, the pressure increasing based on sensed resistance force from the robotically gripped object.

16. The method of claim 11 wherein the toroidal actuator includes an elongated body adapted to contain pressurized fluid, and an elongated cavity concentrically disposed within the elongated body, the elongated cavity adapted to define a linear cavity responsive to increased fluidic pressure, such that a force required to manipulate the elongated cavity in an annular shape is proportional to the fluid pressure.

17. The method of claim 11 further comprising receiving a signal from an end actuator disposed at a distal end of the toroidal actuator, the toroidal actuator further having a proximal end adapted for insertion of an operator member, the end actuator adapted for communication with the operator member and responsive to robotic contact with the robotically gripped object.

18. The method of claim 11 wherein the toroidal actuator is responsive based on soft sensing of the robotic actuator, the fluidic pressure in the toroidal actuator increasing in response to an increased force signal from the robotic actuator.

19. A telepresence control system, comprising: a teleoperator for detecting movement of a slave manipulator responsive to an operator; slave manipulator for implementing the detected movement and receiving telepresence signals from the slave manipulator; and a toroidal actuator on the teleoperator and responsive to the telepresence signals for providing haptic feedback based on the slave manipulator, the haptic feedback defined by fluidic pressure indicative of a compressive resistance force from a robotically gripped object, the toroidal actuator responsive to fluidic pressure for providing the haptic feedback from a teleoperated robotic member, the haptic feedback defined by increasing fluidic pressure indicative of a compressive resistance force from a robotically gripped object.

* * * * *